UNITED STATES PATENT OFFICE.

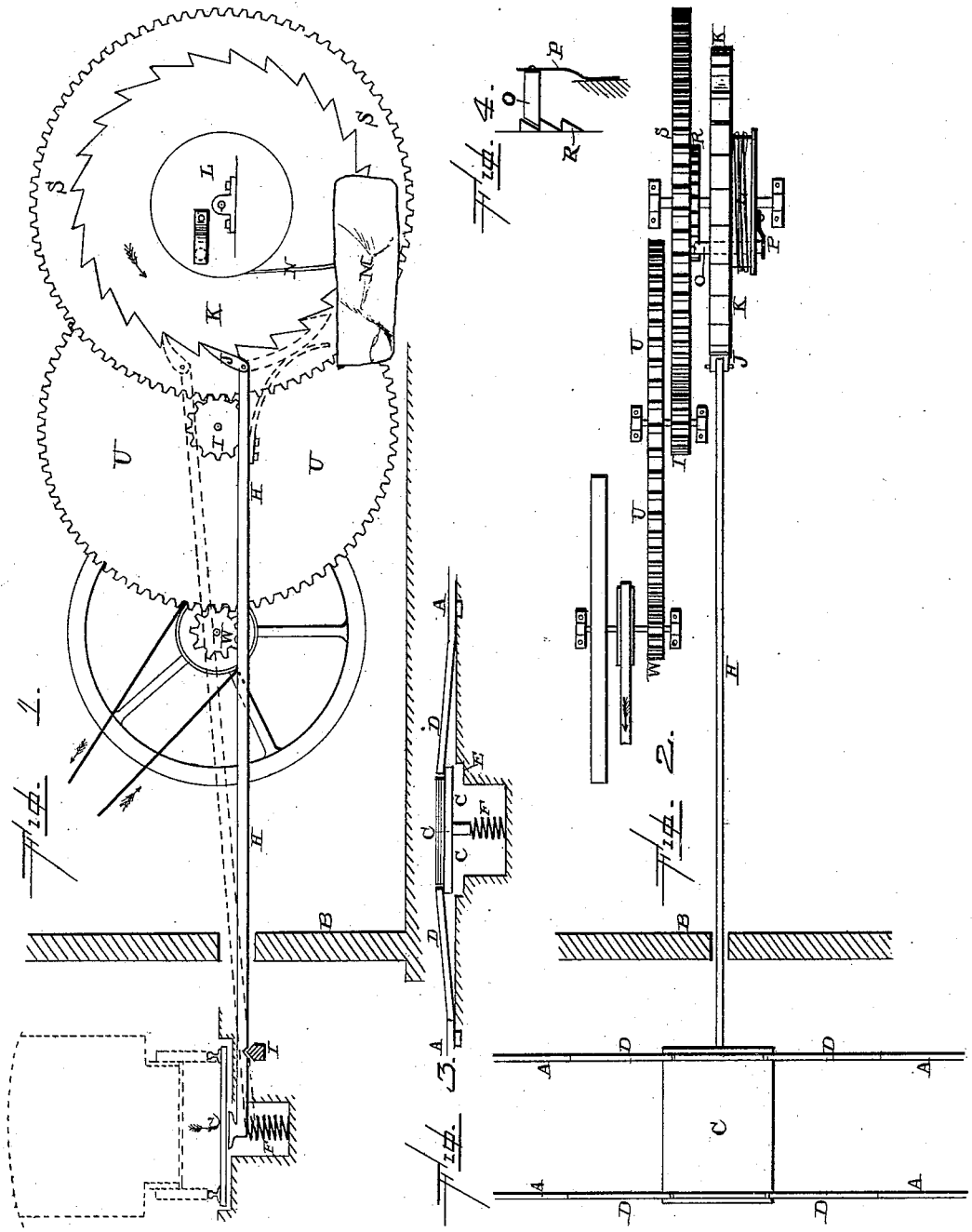

WILLIAM VOGEL, OF CHICAGO, ILLINOIS.

MOTOR FOR LIGHT MACHINERY.

SPECIFICATION forming part of Letters Patent No. 308,218, dated November 18, 1884.

Application filed March 27, 1884. (No model.)

*To all whom it may concern:*

Be it known that I, WM. VOGEL, of Chicago, in the county of Cook and State of Illinois, have invented certain new and useful Improvements in Motors for Light Machinery; and I do hereby declare the following to be a full, clear, and exact description of the invention, such as will enable others skilled in the art to which it pertains to make and use it, reference being had to the accompanying drawings, which form part of this specification.

My invention relates to an improvement in motors for driving light machinery; and it consists in the combination of the platform, which is to be operated by the passage of a car or other heavy body over it, a spring for returning the platform to position and operating the lever which is connected with the platform, and a mechanism both for raising a weight and driving the machinery, as will be more fully described hereinafter.

The object of my invention is to utilize the weight of passing cars and locomotives at any suitable point, and use this weight for driving light machinery of any kind.

Figure 1 is a side elevation of an apparatus embodying my invention. Fig. 2 is a plan view of the same. Fig. 3 is a detail view of the platform, showing it raised into position. Fig. 4 is a detail view of the method of applying the power from one wheel to another.

A represents a railroad-track, and B the walls of a house or shop which is placed by the side of the track at any suitable point. On the railroad-track is placed a suitable track-platform, C, to which the movable rails D are connected, and which platform, when pressed upon by a passing car or locomotive, will sink downward as far as the shoulders E will allow. Under this platform is placed a suitable spiral spring, F, which is sufficiently strong to raise the platform up again after the car or train has passed by, and left the platform free to move. Connected to this vertically-moving platform is the pivoted lever H, which is fulcrumed at I, and which has its inner end provided with a suitable dog for engaging with the ratchet-wheel K. In solid lines is shown one form of a dog, which, as the long end of the lever is forced upward, forces the wheel K around, and in dotted lines is shown another form of dog which will answer the same purpose. Each time that the short end of the lever is depressed by a car or locomotive the long end of the lever is forced upward, so as to force the ratchet-wheel around. Upon the same shaft upon which the ratchet-wheel is placed is a drum, L, over which passes a cord, chain, or wire, N, which is connected at its lower end to the weight M. When the ratchet-wheel is turned, the drum winds the weight up, and this weight keeps the motor in motion for driving a machine of any kind. Instead of the weight M, a suitable spring may be attached to the shaft, and the power of the spring will then be used for driving the machinery instead of the weight. Secured to the drum L is the spring P, which forces the dog O through an opening in the wheel K, so as to engage with the ratchet-teeth R, formed on the side of the large wheel S. The large wheel S is placed upon the same shaft as the wheel K, and each time that the wheel K is moved by the lever the spring-actuated dog O slips over the ratchet-teeth R, and then, as the weight or spring moves the wheel K in the opposite direction, the wheel S is forced around. This wheel S engages with the pinion T, which is placed upon the same shaft as the large wheel U, and which wheel U in turn engages with the pinion W on the shaft upon which the driving-pulley and fly-wheel are placed. This fly-wheel keeps up the motion of the motor during the time in which the ratchet-wheel K is being moved in the opposite direction, so as to take the power of the weight M or spring from driving the machine. Each time that a street or railroad-car or locomotive passes over the platform the platform sinks downward, and by this downward movement gives motion to the ratchet-wheel K for winding up the weight M or a spring. The power of the weight M or the spring is then exerted in driving the motor. There may be any number of these platforms placed along the railroad and the power of the motors joined together, if so desired.

Having thus described my invention, I claim—

1. The combination of the vertically-moving platform and the spring for returning it to position with the lever H, which is provided with a dog at its free end, the ratchet-wheel K, a drum, a weight or a spring, and the dog which is connected to the drum, and which engages with the ratchet-teeth upon the wheel S, substantially as shown and described.

2. The combination of the vertically-moving spring-actuated platform C, spring F, and movable rails D, which are connected to and move with the platform, the lever H, dog J, a series of wheels, and a weight or spring which is connected thereto, substantially as set forth.

In testimony whereof I affix my signature in presence of two witnesses.

WILLIAM VOGEL.

Witnesses:
F. A. LEHMANN,
L. F. GARDNER.